United States Patent
Be et al.

(10) Patent No.: US 9,366,216 B2
(45) Date of Patent: Jun. 14, 2016

(54) USER INTERFACE FOR AUTOMATIC START-STOP SYSTEM AND METHOD OF CONTROLLING THE SAME

(75) Inventors: Tuan Anh Be, Livonia, MI (US); Kirk Pebley, Novi, MI (US); Hank L. Kwong, Farmington Hills, MI (US); George Edmund Walley, Novi, MI (US); Filip Tomik, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 565 days.

(21) Appl. No.: 13/617,964

(22) Filed: Sep. 14, 2012

(65) Prior Publication Data

US 2014/0081561 A1      Mar. 20, 2014

(51) Int. Cl.
| | | |
|---|---|---|
| *F02N 11/08* | (2006.01) | |
| *B60W 50/08* | (2012.01) | |
| *F02N 11/10* | (2006.01) | |
| *F02D 41/22* | (2006.01) | |
| *B60W 50/14* | (2012.01) | |
| *B60W 50/00* | (2006.01) | |

(52) U.S. Cl.
CPC ......... *F02N 11/0818* (2013.01); *B60W 50/085* (2013.01); *F02N 11/0822* (2013.01); *B60W 2050/0093* (2013.01); *B60W 2050/146* (2013.01); *B60W 2540/04* (2013.01); *F02D 2041/228* (2013.01); *F02N 11/103* (2013.01); *Y02T 10/48* (2013.01)

(58) Field of Classification Search
CPC ... F02D 41/042; F02D 41/062; F02D 41/064; F02D 2041/0095; F02D 41/0002; F02D 41/009; B60W 10/06; F02N 11/08; F02N 11/0848; F02N 11/0814; F02N 11/087; F02N 11/0818; F02N 11/10; G09B 9/04; G09B 9/048
USPC ................ 701/112, 113, 51, 53, 65, 70, 123; 123/179.3, 179.4; 434/29–71; 340/438–461
See application file for complete search history.

(56) References Cited

U.S. PATENT DOCUMENTS

| | | | | |
|---|---|---|---|---|
| 3,936,955 | A * | 2/1976 | Gruen et al. ..................... | 434/63 |
| 6,092,021 | A * | 7/2000 | Ehlbeck et al. ............... | 701/123 |
| 6,117,007 | A * | 9/2000 | Matsuyama et al. ............. | 463/6 |
| 6,251,046 | B1 * | 6/2001 | Yoshino et al. ............... | 477/187 |
| 6,434,450 | B1 | 8/2002 | Griffin, Jr. et al. | |
| 6,494,784 | B1 * | 12/2002 | Matsuyama et al. ............. | 463/6 |
| 6,532,926 | B1 * | 3/2003 | Kuroda et al. ............. | 123/179.4 |

(Continued)

OTHER PUBLICATIONS

Ecological Driver Assistant System by Honda, Japan Technology Information, pp. 1-6 (Nov. 25, 2008).

(Continued)

*Primary Examiner* — Stephen K Cronin
*Assistant Examiner* — Susan Scharpf
(74) *Attorney, Agent, or Firm* — Brooks Kushman P.C.

(57) ABSTRACT

Vehicles equipped with an automatic start-stop system may include an interface for conveying inhibitors preventing an engine from auto-stopping in addition to the status of the automatic start-stop system. The system may identify one or more inhibitors actively preventing an auto-stop event from occurring and select at least one of the active inhibitors based on a priority scheme. The interface may communicate the at least one selected inhibitor to a driver using a display or a speaker, or both.

10 Claims, 4 Drawing Sheets

(56) References Cited

U.S. PATENT DOCUMENTS

| | | | |
|---|---|---|---|
| 6,650,993 B2* | 11/2003 | Wolf et al. | 701/112 |
| 6,760,655 B2* | 7/2004 | Matsubara et al. | 701/54 |
| 6,839,621 B2* | 1/2005 | Kaneko | 701/112 |
| 7,240,750 B2 | 7/2007 | Patel | |
| 7,283,810 B1* | 10/2007 | Arakawa | G08C 17/02 340/438 |
| 7,354,379 B2* | 4/2008 | Moriya | 477/199 |
| 7,603,228 B2 | 10/2009 | Coughlin | |
| 7,698,053 B2* | 4/2010 | Mori | 701/112 |
| 7,772,970 B2* | 8/2010 | Masuda | F02D 11/105 340/438 |
| 8,120,478 B2* | 2/2012 | Skaff et al. | 340/438 |
| 8,988,206 B2* | 3/2015 | Okada | F02N 11/0814 123/179.4 |
| 2002/0107632 A1* | 8/2002 | Fuse et al. | 701/112 |
| 2002/0183917 A1 | 12/2002 | Wolf et al. | |
| 2004/0122586 A1 | 6/2004 | Wolf et al. | |
| 2007/0245997 A1* | 10/2007 | Levasseur et al. | 123/179.4 |
| 2007/0272187 A1* | 11/2007 | Celisse et al. | 123/179.4 |
| 2007/0288154 A1 | 12/2007 | Letang | |
| 2008/0059035 A1 | 3/2008 | Siddiqui et al. | |
| 2009/0234528 A1 | 9/2009 | Crombez | |
| 2009/0281715 A1 | 11/2009 | Paik | |
| 2009/0319161 A1* | 12/2009 | Abendroth | 701/112 |
| 2010/0030414 A1 | 2/2010 | Watanabe et al. | |
| 2010/0102945 A1* | 4/2010 | Watson et al. | 340/462 |
| 2010/0106352 A1 | 4/2010 | Skaff et al. | |
| 2010/0305805 A1 | 12/2010 | Yamaguchi | |
| 2011/0095878 A1* | 4/2011 | Skaff et al. | 340/441 |
| 2011/0190095 A1 | 8/2011 | Bollig et al. | |
| 2011/0202216 A1 | 8/2011 | Thai-Tang et al. | |
| 2011/0230309 A1 | 9/2011 | Albrecht | |
| 2012/0077640 A1 | 3/2012 | Saito et al. | |
| 2013/0245925 A1 | 9/2013 | Malone et al. | |
| 2013/0271276 A1* | 10/2013 | Okada | F02N 11/0814 340/441 |
| 2014/0379200 A1* | 12/2014 | Yagi | G07C 5/0808 701/29.4 |
| 2015/0314727 A1* | 11/2015 | Marunaka | B60K 6/22 340/441 |

OTHER PUBLICATIONS

Honda Broadens Use of ECO Assist Function in Expanded Hybrid Car Line-Up With CR-Z and Jazz Hybrid, http://World.honda.com/HybridWorld/Index.html, pp. 1-3 (Mar. 24, 2011).

Non-Final Office Action for U.S. Appl. No. 13/832,156 dated May 8, 2015.

* cited by examiner

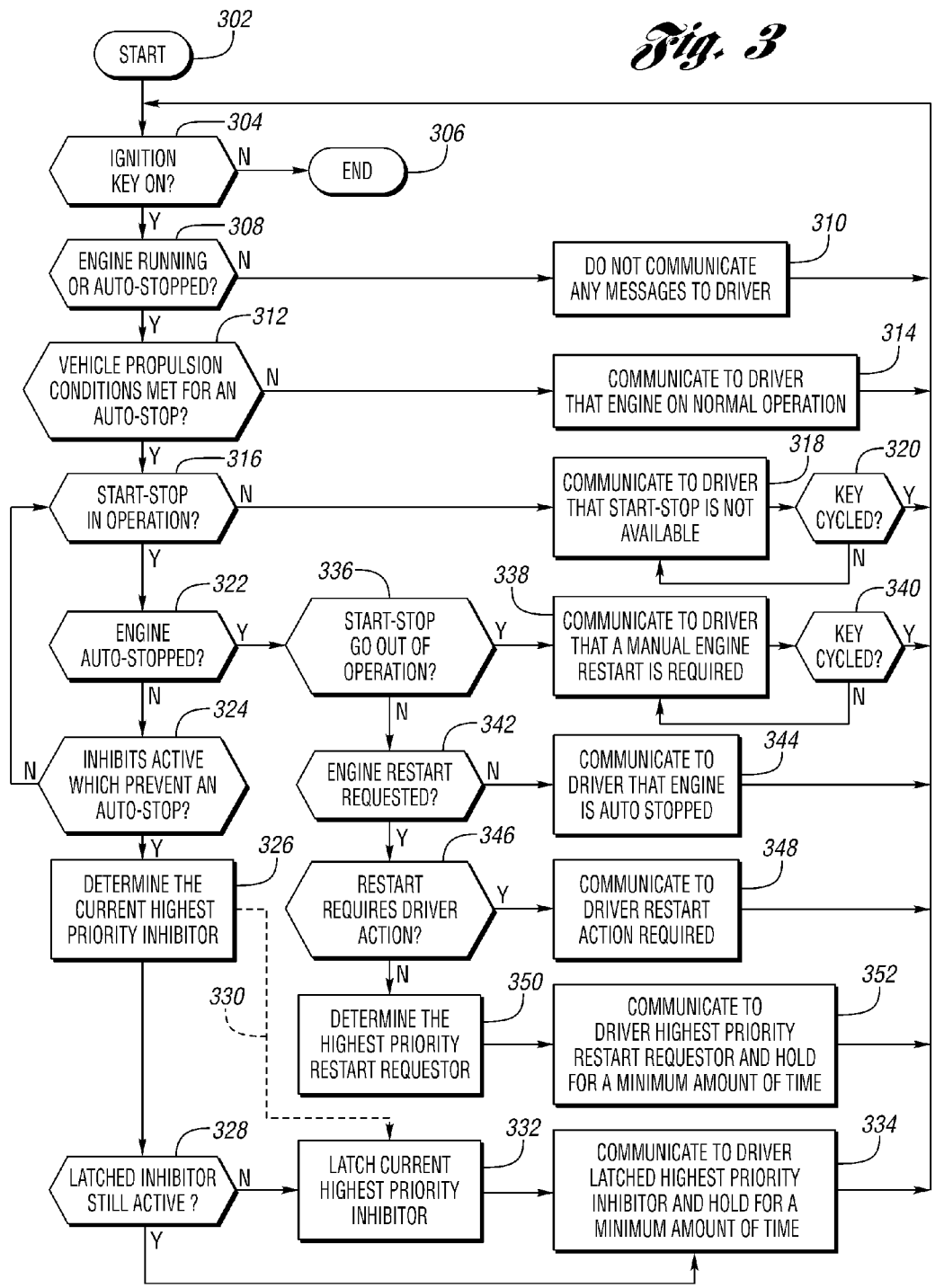

USER INTERFACE FOR AUTOMATIC START-STOP SYSTEM AND METHOD OF CONTROLLING THE SAME

TECHNICAL FIELD

The present application relates to a user interface for communicating information pertaining to the status of an automatic start-stop system in an equipped vehicle.

BACKGROUND

Hybrid technologies may be grouped into "full hybrid" and "micro-hybrid technologies." Full hybrid technologies may contain a hybrid propulsion system that utilizes at least two different sources of torque for propelling the vehicle. As one non-limiting example, a hybrid propulsion system may combine a conventional propulsion system that includes an internal combustion engine and a stepped-ratio change automatic transmission with an electric propulsion system that includes one or more electric motors and a rechargeable energy storage device, such as a battery, that can power the electric motors or store energy to improve fuel economy over the conventional vehicle. A hybrid electric vehicle (HEV) typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor, independent of the internal combustion engine.

Micro-hybrid technologies may contain Integrated Starter Generator (ISG) machines that are not capable of propelling the vehicle but are capable of supporting a rapid start of the engine as well as on/off operation of the engine while the vehicle is stationary. Thus, using micro-hybrid technologies, motor vehicles can be designed to employ certain aspects of HEV technology to reduce fuel consumption, but without use of a hybrid drivetrain. In such vehicles, sometimes called micro-hybrids, shutting down the engine during conditions where the engine operates at idle speed is used to reduce fuel consumption in a conventional powertrain that includes an internal combustion engine and a stepped-ratio change automatic transmission, but no electric machine for driving the wheels.

In conventional ISG based micro-hybrids, the ISG may be placed in series with the internal combustion engine and transmission system. The ISG takes the place of the traditional engine starter as well as the traditional alternator/generator that generates electric power for accessories and battery storage. The ISG may allow the engine to go from zero rpm to several hundred rpm in a fraction of a second, thus providing seamless start-stop capability to the driver in addition to increased fuel economy and reduced emissions.

The primary condition that is checked by a micro-hybrid powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine.

SUMMARY

One or more embodiments of the present application are directed to a system including a controller and an interface in communication with each other. The controller may be configured to receive input indicative of vehicle propulsion conditions and a presence of one or more auto-stop inhibitors. The interface may be configured to output a message identifying at least one of the inhibitors based on a priority scheme when vehicle propulsion conditions for an auto-stop event are satisfied.

The priority scheme may be at least partially based on whether a driver has at least partial control over an inhibitor of the one or more auto-stop inhibitors. The interface may include a display having a selectable automatic start-stop display screen that displays the message identifying the at least one inhibitor. Further, the display may include an automatic start-stop indicator that is displayed in one of a plurality of indicator states based on a status of an automatic start-stop system.

The controller may be further configured to receive input indicating a restart action is required to restart an engine and the display is further configured to display a pop-up alert conveying the required restart action. The pop-up alert may be displayed on any one of a number of selectable information display screens.

The controller may be configured to latch a current highest priority inhibitor according to the priority scheme and the display may display the message identifying the latched inhibitor. Further, the latched inhibitor may remain latched for as long as it is active despite a higher priority inhibitor subsequently becoming active.

One or more additional embodiments of the present application are directed to a method including a step for receiving input indicating vehicle propulsion conditions for auto-stopping an engine are satisfied and one or more auto-stop inhibitors are present and a step for outputting a message corresponding to at least one of the inhibitors based on an priority scheme.

The step of outputting a message corresponding to at least one of the inhibitors may include displaying the message on a display based on a predetermined display priority scheme. Moreover, the display priority scheme may be at least partially based on whether a driver has at least partial control over an inhibitor. Further, the message may be displayed on a selectable automatic start-stop display screen.

Displaying the message on a display may include latching a current highest priority inhibitor according to the display priority scheme and displaying the message identifying the latched inhibitor on the display. The latched inhibitor may remain latched for as long as it is active despite a higher priority inhibitor subsequently becoming active.

One or more additional embodiments of the present application are directed to a method including steps for receiving input indicating an engine is currently auto-stopped and an engine restart is being requested, identifying a restart action to restart the engine, and outputting a message corresponding to the restart action.

The step of outputting a message corresponding to the restart action may include displaying the message on a display. Moreover, the message may be a pop-up alert that is displayed on one of a number of selectable information display screens. The message corresponding to the restart action may include instructions to restart the engine manually.

Additionally, the engine restart request may be in response to a request for vehicle propulsion. To this end, the message corresponding to the restart action may include instructions to operate a pedal or select a particular gear before the engine is automatically restarted.

BRIEF DESCRIPTION OF THE DRAWINGS

FIG. 3 is a simplified, exemplary flow diagram depicting a method for conveying automatic stop-start system information via the user interface in accordance with one or more embodiments of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
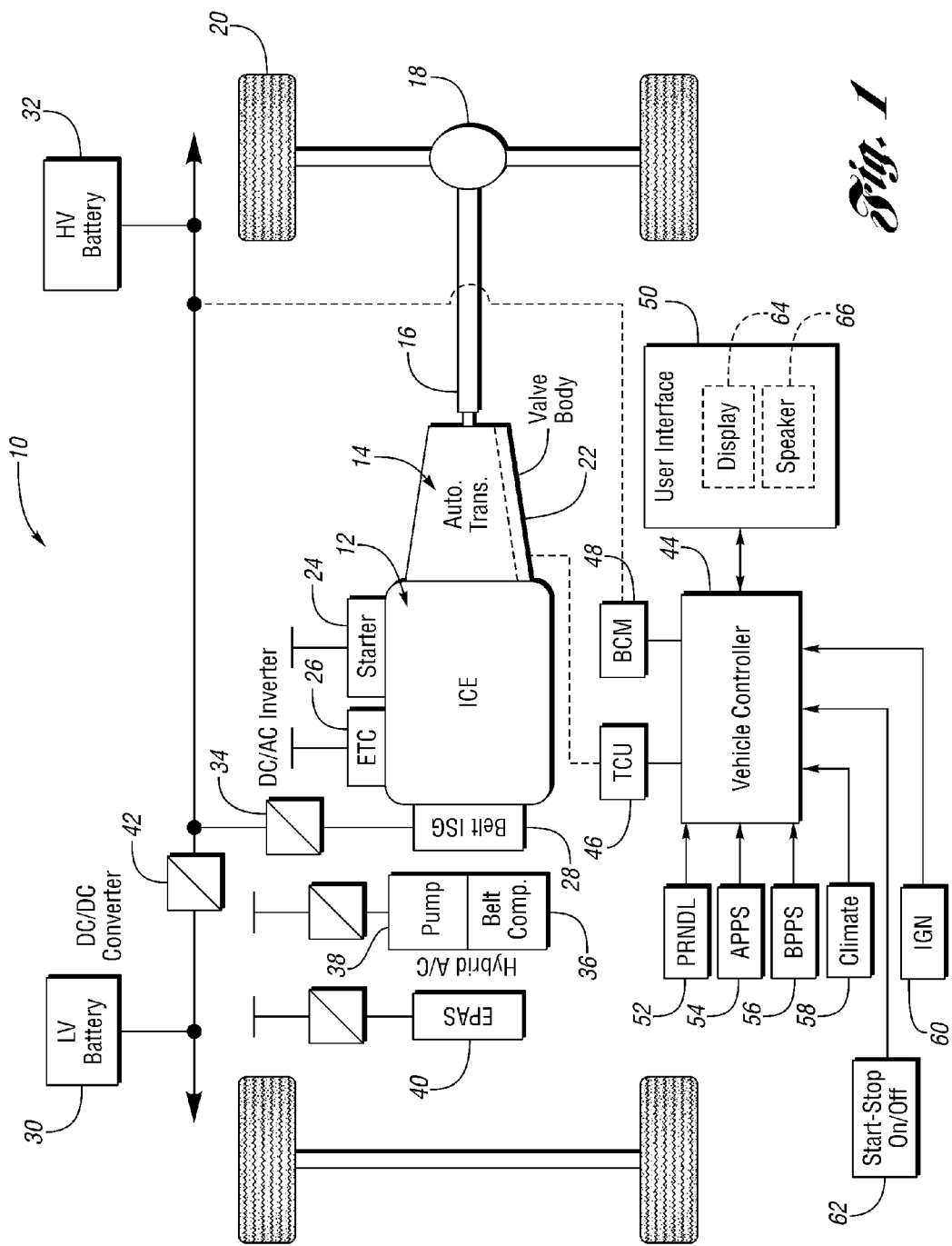
FIG. 1 is a simplified, exemplary schematic representation of a vehicle including an automatic start-stop system and a user interface in accordance with one or more embodiments of the present application.

FIG. 1 schematically illustrates a vehicle 10 including an internal combustion engine 12 and an automatic transmission 14. Torque delivered from a crankshaft of the internal combustion engine 12 is delivered through multiple-ratio gearing of the transmission 14 to a driveshaft 16 and to a final drive differential-and-axle assembly 18 for traction wheels 20. The gearing for the transmission 14 may establish multiple torque ratios under the control of a valve body 22. The ratios may be established by engageable and disengageable clutches and brakes in a conventional fashion. The transmission 14 may be configured for a neutral state by disengaging a forward drive clutch. A starter motor 24 under the control of a low-voltage battery (not shown) can be used to start the engine 12 under cold start conditions. The vehicle 10 may also include an electronic throttle control 26 for the engine 12.

In addition, vehicle 10 may include an automatic start-stop system that automatically shuts down and restarts the engine 12 to reduce the amount of time the engine spends idling, thereby reducing fuel consumption and emissions. Automatically shutting down the engine can be most advantageous for vehicles which spend significant amounts of time waiting at traffic lights or frequently come to a stop in traffic jams. While the automatic start-stop feature is present in HEVs, automatic start-stop systems may also appear in vehicles that lack a hybrid electric powertrain, such as vehicle 10. The vehicle 10 may enter the auto-stop mode (i.e., the engine is auto-stopped) when certain vehicle propulsion conditions are met, such as when the driver has applied the brakes and the vehicle speed is below a predetermined speed threshold. Once the driver indicates a request for vehicle propulsion (e.g., by releasing the brake pedal), a powertrain control module may automatically restart the engine 12.

To this end, the engine 12 may be drivably connected to a crankshaft pulley, which drives a belt-driven integrated starter-generator 28 in one or more embodiments of the present application. Although a belt-drive is disclosed, other types of drives could be used to provide a driving connection between the engine 12 and the starter-generator 28. For example, a flexible chain drive or a geared drive could be used, depending on design choice. The starter-generator 28 may be electrically coupled to a voltage source, such as a low-voltage battery 30 or a high-voltage battery 32. The high-voltage battery 32 may be connected to the starter-generator 28 through a DC/AC inverter 34.

Since automobile accessories like air conditioners and water pumps have typically been designed to run off a serpentine belt on an engine, those systems need to be redesigned to function properly when the engine is turned off. In full HEVs, an electric motor is typically used to power these devices instead. In vehicle 10, hybrid vehicle accessories, such as an air conditioning compressor 36, a fuel pump 38 and a power steering pump 40, may be electrically powered by low-voltage battery 30. The voltage sources may be separated by a DC/DC converter 42, which may adjust, or "step down" the voltage level to allow the high-voltage battery 32 to charge the low-voltage battery 30.

A vehicle control system, shown generally as a vehicle controller 44, may be provided to control various components and subsystems of the vehicle 10, including the automatic start-stop system. Although it is shown as a single controller, the vehicle controller 44 may include multiple controllers that may be used to control multiple vehicle systems. For example, the vehicle controller 44 may be a vehicle system controller/powertrain control module (VSC/PCM). In this regard, the PCM portion of the VSC/PCM may be software embedded within the VSC/PCM, or it can be a separate hardware device. The vehicle controller 44 may generally include any number of microprocessors, ASICs, ICs, memory (e.g., FLASH, ROM, RAM, EPROM and/or EEPROM) and software code to co-act with one another to perform a series of operations. The vehicle controller 44 may communicate with other controllers over a hardline vehicle connection using a common bus protocol (e.g., CAN). For example, the vehicle controller 44 may communicate with a transmission control unit (TCU) 46 and a battery control module (BCM) 48, which is electrically coupled to the high-voltage battery 32. Some or all of these various controllers can make up a control system, which, for reference purposes, may be the vehicle controller 44.

Although illustrated and described in the context of the vehicle 10, which is a micro-hybrid vehicle, it is understood that embodiments of the present application may be implemented on other types of vehicles having different powertrain topologies, such as full hybrid electric vehicles. Moreover, even though vehicle 10 is depicted with an automatic transmission, one or more embodiments of the present application may also be employed in vehicles having manual transmissions.

In addition to the foregoing, the vehicle 10 may include a user interface 50 to facilitate communications with a driver. The user interface may communicate with the vehicle controller 44 and may provide relevant vehicle content to the driver. The vehicle controller 44 may be configured to receive input signals that are indicative of current operating and/or environmental conditions of the vehicle 10, including signals relevant to the operation of the automatic start-stop system. For instance, the vehicle controller may receive input signals from the TCU 46 and the BCM 48, as well as a gear selector (PRNDL) 52, an accelerator pedal position sensor (APPS) 54, a brake pedal position sensor (BPPS) 56, a climate control module 58, an ignition switch (IGN) 60, and an automatic start-stop switch 62, or the like. The automatic start-stop switch 62 can allow the driver to manually deactivate the automatic start-stop system, thereby preventing engine auto-stops at the driver's request. The vehicle controller 44 may provide output to the user interface 50 such that the user interface 50 conveys vehicle operating information, such as information relating to the operation of the automatic start-stop system, to the driver. As will be described below, the user interface 50 may communicate relevant vehicle information to a driver visually through a display 64 and/or audibly via a speaker 66.

Referring generally to FIGS. 2a-f, the user interface 50 is shown in greater detail in accordance with one or more embodiments of the present application. As seen therein, the user interface 50 may include at least one display 64 and associated circuitry, including hardware and/or software, necessary to communicate with the vehicle controller 44 and operate the display 64. The display 64 may be generally used to convey relevant vehicle content to a driver of the vehicle 10 including, for example, information relating to the operation of the vehicle 10 and/or the status of the automatic stop-start system. The display 64 may be disposed within a dashboard (not shown) of the vehicle 10, such as in an instrument panel or center console area. Moreover, the display 64 may be part of another user interface system, such as a navigation system, or may be part of a dedicated information display system. The display 64 may be a liquid crystal display (LCD), a plasma display, an organic light emitting display (OLED), or any other suitable display. The display 64 may include a touch screen for receiving driver input associated with selected areas of the display 64. The user interface or display may also include one or more buttons (not shown), such as hard keys or soft keys, for effectuating driver input. Other operator inputs known to one of ordinary skill in the art may also be employed without departing from the scope of the present application. Additionally, the user interface 50 may also include a speaker 66 (FIG. 1) for outputting information audibly.

A vehicle equipped with automatic start-stop system, such as vehicle 10, often includes many electrical loads and other vehicle subsystems that may prevent the vehicle from entering the auto-stop mode or, while in the auto-stop mode, may require the engine 12 to restart sooner than anticipated. As used herein, items, events or conditions that prevent the vehicle 10 from entering the auto-stop mode may be referred to as auto-stop inhibitors. Items, events or conditions that cause the engine 12 to restart may be referred to herein as restart requestors. Restart requestors may be driver-induced or system-induced. Driver-induced restart requestors may refer to events in which the driver requests engine power directly in order to propel the vehicle 10. On the other hand, system-induced restart requestors may refer to items, events or conditions that cause the engine 12 to restart sooner than expected (e.g., before a driver request for vehicle propulsion). System-induced restarts may be indirectly influenced by driver actions. For reference purposes, auto-stop inhibitors and system-induced restart requestors may be collectively referred to herein simply as inhibitors.

There can be several reasons why inhibitors prevent the vehicle 10 from entering or remaining in the auto-stop mode, such as maintaining minimum battery energy sufficient to auto-start the engine 12 or keeping the battery state of charge (SOC) and state of health (SOH) at robust levels for proper maintenance and longevity. Thus, when the cumulative effect of vehicle electrical loads becomes excessive or exceeds an electrical load threshold, an engine auto-stop may be prevented or discontinued. Examples of electrical loads that may impact the status of the automatic start-stop system may include auxiliary lighting, window defrost, wipers, climate control, heated (or cooled) seats, heated steering wheel, auxiliary power (e.g., plugged-in device), and the like. Certain electrical loads may have a greater impact on the status of the automatic start-stop system than others. Moreover, certain electrical loads, when introduced, may be independently sufficient to inhibit the auto-stop mode on their own. Additionally, certain vehicle operating modes or states may prevent the engine from auto-stopping. For example, four-wheel drive, trailer towing, automatic curb-side parking, various other vehicle maneuvering modes, and the like may inhibit an auto-stop. Auto-stops may also be inhibited due to gear selection, or because a vehicle door is ajar or the driver's seat belt is unlatched. Furthermore, certain environmental conditions may also preclude auto-stopping, such as the outside ambient temperature or the engine temperature. Finally, the automatic start-stop system may be manually deactivated by the driver via the automatic start-stop switch preventing engine auto-stops at the driver's request.

Vehicle divers may be unaware of the impact of the aforementioned electrical loads and/or vehicle operating modes on the automatic start-stop system. Indeed, drivers may operate electrical loads at higher power demands (e.g., wipers ON vs. intermittent, max A/C cooling, etc.) or forget they are even on. However, the presence of these inhibitors can lead to reduced fuel economy and increased emissions.

According to one or more embodiments of the present application, the user interface 50 may be used to convey information concerning the operation and status of the automatic start-stop system of vehicle 10. This information may be communicated in the form of on-demand messages, pop-up alerts, tell-tales, or the like. In particular, the user interface 50 may communicate messages indicating what is preventing the engine 12 from auto-stopping or what has caused the engine 12 to restart during an auto-stop event. The user interface 50 may communicate these inhibitors visually or audibly.

Figure 2A:
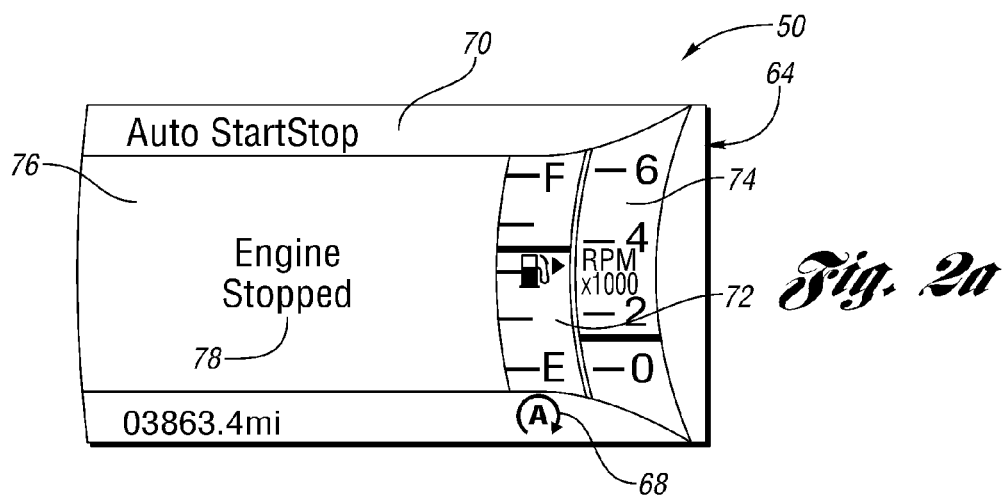
FIGS. 2a-f depict exemplary views of a user interface display in accordance with one or more embodiments of the present application.
Figure 2B:
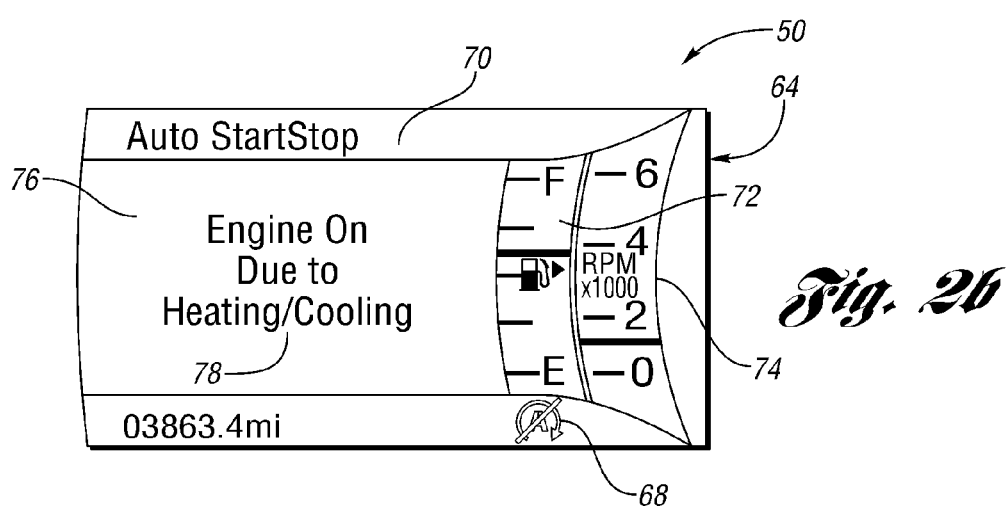

Referring to FIGS. 2a-f, the display 64 may include an automatic start-stop indicator 68. The automatic start-stop indicator 68 may be a tell-tale reflecting the status of the automatic start-stop system. Accordingly, the automatic start-stop indicator 68 may be displayed on display 64 in one of a number of states. For instance, a first indicator state may indicate that the automatic start-stop system is active and the engine 12 is currently auto-stopped, as depicted in FIG. 2a. As an example, the automatic start-stop indicator 68 may be displayed or otherwise illuminated in a solid green or blue color when in the first indicator state. A second indicator state may indicate that the automatic start-stop system is active and functional, but one or more inhibitors are present preventing the engine 12 from being auto-stopped. As one example, the automatic start-stop indicator 68 may be shown in grey when in the second indicator state. Additionally or alternatively, the automatic start-stop indicator 68 may be displayed with one or more lines passing through it to give it the appearance of being "struck out" when in the second indicator state, as depicted in FIG. 2b.

The automatic start-stop indicator 68 may also be displayed in a third indicator state to alert the driver that some driver action may be required, such as pressing the brake or accelerator pedal to confirm driver presence. The third indicator state may be displayed may also be displayed when the engine 12 is stopped, but an automatic restart is not available. Thus, the engine 12 can only be restarted manually. A manual engine restart may be required when a system or operational fault occurs, for example, when the battery SOC cannot support an automatic restart using the integrated starter-generator 28 or the driver fails to press a pedal to confirm driver presence in a predetermined amount of time. As an example, this third indicator state may be exhibited by displaying the automatic start-stop indicator 68 in an amber color. Moreover, the automatic start-stop indicator 68 may be flashed on and off when in the third indicator state in order to alert the driver that some driver action may be required. As will be described in greater detail below, an additional alert may accompany the automatic start-stop indicator 68 when it is in the third indicator state to help convey to the driver that a manual restart of the engine 12 is required for continued vehicle operation (e.g., see FIG. 2*c*). The automatic start-stop indicator 68 may also include a fourth indicator state. In the fourth indicator state, the automatic start-stop indicator 68 may not be displayed at all, such as when the engine 12 is on due to normal vehicle operation (e.g., see FIG. 2*d*).

The display 64 may also include an automatic start-stop display screen 70. The start-stop display screen 70 may be one of several display screens for displaying relevant vehicle content to a driver on demand. For example, a driver may select the start-stop display screen 70 from a menu of various information display screens. Upon selection, the start-stop display screen 70 may be displayed on the display 64. The start-stop display screen 70 may include one or more gauges common to several information display screens. For example, the display 64 may include a fuel gauge 72, a tachometer 74, or the like that is displayed on the start-stop display screen 70 as well as other selectable information display screens. Further, the start-stop display screen 70 may include a message region 76 for displaying messages 78 concerning the automatic start-stop system. The messages 78 may contain information regarding the automatic start-stop system beyond just system status in order to help drivers increase the time spent in auto-stop mode, thereby improving fuel economy. In particular, the messages 78 may indicate which inhibitors are currently preventing the engine 12 from being auto-stopped. For instance, when the vehicle propulsion conditions for an auto-stop are otherwise met, at least one active inhibitor may be displayed in the message region 76 of the start-stop display screen 70 (e.g., see FIG. 2*b*). Thus, the driver may be informed of at least one corresponding reason as to why the engine 12 is not auto-stopped.

The inhibitors may be displayed according to a display priority scheme, with higher priority inhibitors being selected for display over lower priority inhibitors for display purposes. Therefore, if multiple inhibitors are currently preventing the engine 12 from auto-stopping, less than all of these inhibitors may be conveyed to the driver. According to one or more embodiments of the present application, the display 64 may display the single highest priority inhibitor currently preventing the automatic start-stop system from auto-stopping the engine 12. Since multiple auto-stop inhibitors may be simultaneously active at a given moment in time, the display priority scheme may be used to determine which of these active inhibitors to convey to the driver. The display priority scheme may be a predetermined, calibratable priority scheme in which all the potential inhibitors are assigned a display priority. The controller 44 may then determine which inhibitors are active and display a message 78 identifying the highest priority active inhibitor in the message region 76.

Several factors may be considered in determining the calibratable display priority scheme. Prior to assigning each inhibitor a priority, the inhibitors may be grouped into categories. For example, the inhibitors may be characterized as either hard inhibitors or soft inhibitors. Hard inhibitors may refer to active inhibitors in which the driver has no direct control over, such as the outside ambient temperature. Soft inhibitors may refer to active inhibitors in which the driver has some control over, such as heated seats, A/C usage, and the like. Hard inhibitors may typically be assigned a higher priority over soft inhibitors in the display priority scheme. This may prevent displaying an active soft inhibitor to the driver, which the driver subsequently removes through corrective action, only to then be shown an active hard inhibitor that the driver has no direct control over. The inhibitors may be binned into additional categories, besides just hard and soft inhibitors, without departing from the scope of the present application. For instance, an additional category of inhibitors may include confirmation inhibitors. Confirmation inhibitors may refer to active inhibitors which require driver action (e.g., driver presence confirmation).

Figure 2C:
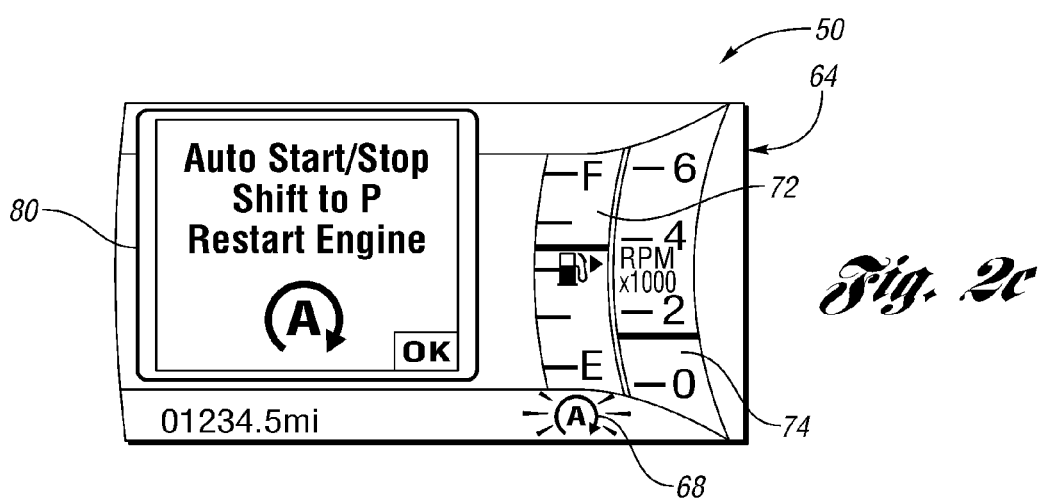
Figure 2D:
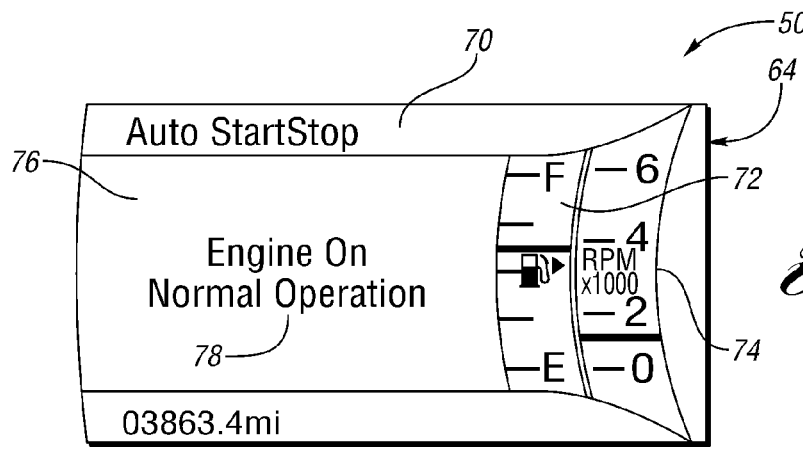
Figure 2E:
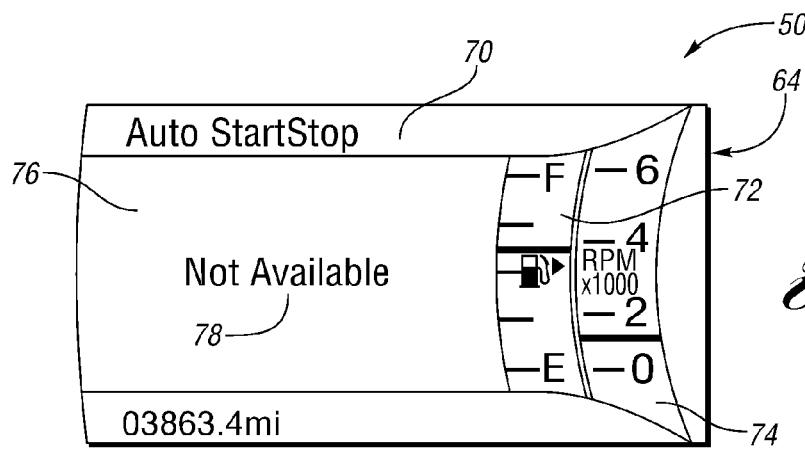
Figure 2F:
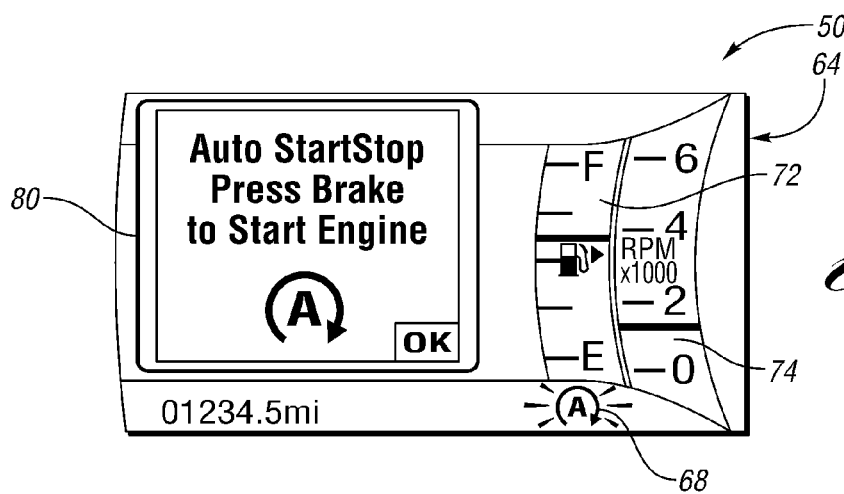

Accordingly, the display 64 may not only communicate the status of the automatic start-stop system, but may also convey the reasons preventing an auto-stop from occurring. If the inhibitor displayed on the automatic start-stop display screen 70 is one that the driver has some control over, the driver may be encouraged to take corrective action to remove the inhibitor and increase the amount of time spent in the auto-stop mode. As shown in FIGS. 2*c* and 2*f*, the display 64 may also display pop-up alerts 80 relating to the automatic start-stop system. The pop-up alerts 80 may appear automatically when certain conditions require driver action to allow an engine auto-stop or an engine restart to occur. In this regard, the pop-up alerts 80 may appear on any information display screen, not just the start-stop display screen 70. The pop-up alerts 80 may be removed from the display 64 when the indicated driver action has been completed.

As previously described, the user interface 50 may further include a speaker 66 (FIG. 1) for communicating information concerning the automatic start-stop system. To this end, the content of the pop-up alerts 80 may be communicated to the driver by voice. Additionally, the messages 78 displayed in the message region 76 of the start-stop display screen 70 may be voice communicated to the driver upon the driver's request.

FIG. 3 is a simplified, exemplary flow diagram illustrating a method for controlling the automatic start-stop information communicated by the user interface 50, in accordance with one or more embodiments of the present application. Terminal 302 provides an entry to the method. At step 304, the controller 44 may determine whether the ignition switch 60 is in an "ON" position, which may include an accessory position or run/start positions. If the ignition switch 60 is not in an ON position, the method may conclude at terminal 306. If the ignition switch 60 is in an ON position, the method may proceed to step 308. At step 308, the controller 44 may determine whether the engine 12 is running or auto-stopped. If the engine 12 is not running, but it is also not in the auto-stop mode (e.g., the ignition switch 60 is in the accessory position), the method may proceed to step 310. At step 310, no messages pertaining to the automatic start-stop system may be communicated to the driver. On the other hand, if the engine 12 is running or auto-stopped, the method may proceed to step 312.

At step 312, the controller 44 may determine whether the vehicle propulsion conditions for an auto-stop event are satisfied. For instance, the engine 12 will not be auto-stopped when the vehicle 10 is in motion. Therefore, one vehicle propulsion condition may be whether the vehicle speed is less than a predetermined speed threshold. Some additional vehicle propulsion conditions may include whether the brake pedal is being pressed and/or whether the accelerator pedal is not being pressed. Other vehicle propulsion conditions may need to be satisfied, in addition to or in place of, the conditions previously described depending upon the vehicle and/or system requirements. If the vehicle propulsion conditions for auto-stopping the engine 12 are not met, the user interface 50 may communicate to the driver that the engine 12 is running under normal operating conditions, as shown at step 314 and depicted in FIG. 2*d*. When this occurs, the automatic start-stop indicator may be in the fourth indicator state in which it is not displayed or illuminate at all. If, however, the vehicle propulsion conditions are met, the method may proceed to step 316. At step 316, the controller 44 may determine whether the automatic start-stop system is in operation. The automatic start-stop system may go out of operation when a system or operational fault occurs. The automatic start-stop system may enter a fault mode for reasons other than a typical auto-stop inhibitor. For example, the automatic start-stop system may go out of operation or be otherwise unavailable when the battery charge level is too low to support an automatic restart via the integrated starter-generator 28. When a fault mode such as this occurs, the user interface 50 may communicate to the driver that the automatic start-stop system is not available, as provided at step 318. An example of this communication is shown in FIG. 2*e*.

According to one or more embodiments of the present application, when the automatic start-stop system goes out of operation due to a system or operational fault, a manual restart of the engine 12 may be required before the automatic start-stop system can be operational again. Accordingly, the controller 44 may determine whether a key cycle of the ignition switch 60 (or similar action) has been completed at step 320. If a key cycle has not occurred, the user interface 50 may continue to communicate to the driver that the automatic stop-start system is not available, as provided at step 318. If the ignition switch 60 has been cycled, the method may loop back to step 304.

If, at step 316, the controller 44 determines that the automatic start-stop system is in operation, it may then determine whether the engine 12 is currently auto-stopped at step 322. If the engine 12 is not auto-stopped, the controller 44 may then determine whether there are any active inhibitors preventing an auto-stop from occurring, as provided at step 324. If there are no active inhibitors, the method returns to step 316 to determine whether the automatic start-stop system has gone out of operation. On the other hand, if the controller 44 detects the existence of one or more active auto-stop inhibitors, the method may proceed to step 326. At step 326, the controller 44 may identify the highest priority active inhibitor based on the predetermined display priority scheme. Step 328 may be skipped the first time through the loop when the engine 12 is not auto-stopped, as illustrated by line 330. Correspondingly, the method may proceed to step 332 where the highest priority active inhibitor is latched. At step 334, the user interface 50 may communicate to the driver that the engine 12 is on, despite satisfying the vehicle propulsion conditions for an auto-stop event, due at least to the latched highest priority active inhibitor.

With reference to FIG. 2*b*, for example, the display 64 may display a message 78 in the message region 76 of the start-stop display screen 70 indicating that the engine 12 is on due to the latched highest priority active inhibitor (e.g., excessive heating/cooling). According to one or more embodiments, the message 78 communicated at step 334 may be displayed until the latched inhibitor is no longer present or a predetermined minimum time period has elapsed, whichever is longer. The check for whether the latched highest priority inhibitor is still active may occur back at step 328 the next time through the loop. For instance, when the currently latched inhibitor has been removed and at least one other inhibitor is still present, the new highest priority active inhibitor determined at step 326 may then be latched at step 332 and conveyed to the driver at step 334. On the other hand, when the currently latched inhibitor is still active, it may continue to be displayed even if a higher priority inhibitor becomes active in the meantime. When the currently latched inhibitor has been removed and no other auto-stop inhibitors are present, the message 78 may continue to be displayed for at least the predetermined minimum time period or until the engine 12 is confirmed auto-stopped.

Returning to step 322, if the controller 44 determines that the engine 12 is currently auto-stopped, the method may then proceed to step 336 where a check to determine whether the automatic start-stop system has gone out of operation may be carried out. If during an auto-stop event, the automatic start-stop system goes out of operation, the method may proceed to step 338. When the automatic start-stop system goes out of operation during an auto-stop event, the engine 12 may need to be restarted manually. Accordingly, the user interface 50 may communicate to the driver that a manual engine restart is required at step 338. FIG. 2*c* depicts an example of this communication using the display 64. Because a manual engine restart requires driver action, the notification at step 338 may be conveyed using a pop-up alert 80. As previously described, automatic start-stop pop-up alerts 80 may appear on any information display screen and not just the start-stop display screen 70. Additionally, the automatic start-stop indicator 68 may be displayed in the third indicator state, further indicating that no automatic engine restart is available. Referring back to FIG. 3, at step 340, the controller 44 may determine whether a manual engine restart has occurred. If not, the method may return to step 338 in which the user interface 50 continues to communicate to the driver that a manual engine restart is required. If the engine 12 has been restarted manually by the driver, the method may return to step 304.

Returning to step 336, the method may proceed to step 342 if the automatic start-stop system remains in operation during an auto-stop event. At step 342, the controller 44 may determine whether an automatic engine restart has been requested (e.g., checks for the presence of a restart requestor). As previously described, restart requestors may be driver-induced or system-induced. A driver-induced engine restart may occur when the driver indicates a request for vehicle propulsion, such as by lifting a foot from the brake pedal and/or applying a foot to the accelerator pedal. System-induced engine restart requests may result from items, events or conditions that cause the engine 12 to restart sooner than expected or desired. Therefore, as stated previously, system-induced restart requestors may be auto-stop inhibitors that become active during an auto-stop event. Thus, system-induced restart requesters may also be referred to as inhibitors.

If, during an auto-stop event, no driver-induced or system-induced automatic engine restart has been requested, the method may proceed to step 344. At step 344, user interface 50 may communicate to the driver that the engine 12 is presently auto-stopped, as shown in FIG. 2*a*. As seen therein, a message 78 may be displayed on the start-stop display screen 70 in the message region 76 indicating that the engine 12 is auto-stopped. Correspondingly, the automatic start-stop indicator 68 may be shown in the first indicator state. On the other hand, if the system receives an automatic engine restart request during an auto-stop event, the method may proceed to step 346. At step 346, the controller 44 may determine whether a certain driver action is required before the automatic engine restart can occur. This may prevent the engine 12 from automatically restarting when the vehicle 10 is not in a proper state to restart. For instance, in a vehicle 10 having a manual transmission, it may be necessary for the driver to press the brake pedal to confirm the driver's presence or shift to neutral so that the engine 12 does not auto-start when the vehicle 10 is in gear. If at step 346, the automatic engine restart requires driver action, the user interface 50 may communicate the required action to the driver, as provided at step 348. An example of step 348 is illustrated in FIG. 2f. As seen therein, a pop-up alert 80 may appear on the display 64 informing the driver of a driver restart action to be taken (e.g., press the brake pedal) in order to convene the automatic engine restart. Additionally, the start-stop indicator 68 may be displayed in the third indicator state to alert the driver to that a driver confirmation action may be required.

If, at step 346, no driver restart action is necessary prior to automatically restarting the engine, the method may proceed to step 350. Step 350 may be similar to step 326. At step 350, the controller 44 may determine the highest priority restart requestor/inhibitor causing the engine 12 to exit the auto-stop mode. If more than one system-induced restart requestor becomes active during an auto-stop event, the single highest priority restart requestor may be selected based upon the display priority scheme. At step 352, the user interface 50 may communicate the highest priority restart requestor to the driver for a predetermined minimum time period. Thus, FIG. 2b may also illustrate an example of step 352. As shown, the highest priority restart requestor/active inhibitor may be the result of excessive climate control usage. Therefore, the message region 76 of the start-stop display screen 70 may indicate that the engine 12 is on due to heating or cooling. Correspondingly, the automatic start-stop indicator 68 may be displayed in the second indicator state. In this manner, the driver may be provided information that can assist the driver in modifying vehicle driving or operating behavior to increase the amount of time spent auto-stopped, thereby improving fuel economy. If the restart requestor was driver-induced, such as a request to propel the vehicle, then at step 352 the user interface may communicate the restart requestor as "Engine On—Normal Operation," or a similar variant, as illustrated in FIG. 2d.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a controller configured to receive input indicative of vehicle propulsion conditions and a presence of one or more auto-stop inhibitors; and
   an interface, in communication with the controller, configured to output a message identifying at least one of the inhibitors, when vehicle propulsion conditions for an auto-stop event are satisfied, according to a priority scheme at least partially based on whether a driver has at least partial control over an inhibitor, the interface including a display having a selectable automatic start-stop display screen that displays the message identifying the at least one inhibitor;
   wherein the controller is further configured to receive input indicating a restart action is required to restart an engine and the display is configured to display a pop-up alert conveying the required restart action, wherein the pop-up alert is displayed on any one of a number of selectable information display screens.

2. The system of claim 1, wherein the display further includes an automatic start-stop indicator that is displayed in one of a plurality of indicator states based on a status of an automatic start-stop system.

3. The system of claim 1, wherein the controller latches a current highest priority inhibitor according to the priority scheme to establish a latched inhibitor and the display displays the message identifying the latched inhibitor.

4. The system of claim 3, wherein the latched inhibitor remains latched for as long as it is active despite a higher priority inhibitor subsequently becoming active.

5. A method comprising:
   receiving input indicating an engine is currently auto-stopped and an engine restart is being requested;
   identifying a restart action required by a driver to restart the engine; and
   outputting a message corresponding to the restart action.

6. The method of claim 5, wherein outputting a message corresponding to the restart action includes displaying the message on a display.

7. The method of claim 6, wherein the message is a pop-up alert that is displayed on one of a number of selectable information display screens.

8. The method of claim 5, wherein the engine restart request is in response to a request for vehicle propulsion.

9. The method of claim 8, wherein the message corresponding to the restart action includes instructions to operate a pedal before the engine is automatically restarted.

10. The method of claim 8, wherein the message corresponding to the restart action includes instructions to select a particular gear before the engine is automatically restarted.

* * * * *